Patented Dec. 16, 1941

2,266,675

UNITED STATES PATENT OFFICE 2,266,675

COLOR STABLE RESIN CONTAINING INDENE POLYMERS

William H. Carmody, Pittsburgh, Pa., assignor to The Neville Company, Pittsburgh, Pa., a corporation of Pennsylvania No Drawing. Application May 21, 1938, Serial No. 209,369

6 Claims. (Cl. 260—81)

This invention relates to the control and prevention of the deleterious quality of "after-yellowing" of coumarone-indene resin.

As is well known, coumarone-indene resin, commonly known in commerce simply as coumarone or paracoumarone resin, is a synthetic resin produced by the polymerization of bodies contained in crude solvent naphtha, or its equivalent container of polymerizable substances. Coumarone-indene resin has many qualities rendering its use desirable in paint, varnish and other coating compositions. However, these resins are subject to the phenomenon of "after-yellowing," which has militated against their use with spar varnish and other clear, untinted, coating compositions, as well as in coating compositions comprising white, or light-colored, pigments. After-yellowing manifests itself by a progressive darkening in color, so that with aging a resin which is initially of light color, or colorless, turns yellow, yellowish-brown, or even brown. This discoloration occurs in solid coumarone-indene resin, as such, and to some extent in solutions of the resin, but it is particularly prominent in films of the resin, or in films of coating compositions comprising the resin. In connection with my investigations it has been found that after-yellowing of a coumarone-indene resin is a surface phenomenon, which explains why it is exhibited particularly quickly and prominently in films, although it progresses gradually in solid masses of these resins.

It has been recognized that the presence of oxygen is an apparent requisite for the occurrence of after-yellowing, and that conditions, such as sunlight or ultra-violet rays, which tend to activate oxygen in contact with the surface of coumarone-indene resin or films containing it, tend to accelerate the progress of after-yellowing.

A major object of this invention is to provide coumarone-indene resin which is protected against after-yellowing, so as to be color stable, at least from the commercial viewpoint, and to provide a method of controlling or preventing such after-yellowing that is simple, easily performed with standard apparatus and materials, does not add unduly to the cost of the resin, through which the phenomenon of after-yellowing may be substantially eliminated, or repressed to a necessary or desired extent, and which not only does not adversely affect desirable properties, but may actually enhance certain properties of the resin to render them more valuable and of wider utility.

It has been generally supposed that after-yellowing in coumarone-indene resin is the direct result of simple and permanent oxidation of the resin. I have discovered that that supposition is erroneous and that although after-yellowing is the result of a reaction or development initiated by the action of oxygen, it is of more complex nature than supposed heretofore. I have found that it is the indene content of coumarone-indene resin which is primarily responsible for the phenomenon of after-yellowing, and that coumarone, considered by itself, is substantially immune to after-yellowing, although it may contribute to and be an important, if not the major, cause of after-yellowing in indene resin.

I have discovered further, and it is upon this that my invention is in large part predicated, that the after-yellowing potentiality of coumarone-indene resin may be controlled, and even eliminated, at least for commercial requirements, by hydrogenation of a solution of the resin in the presence of a suitable hydrogenation catalyst. Such treatment does not substantially affect the melting point of the resin, and does not depreciate its valuable characteristics, such as inertness toward acids and alkalies, but it does reduce or substantially eliminate its after-yellowing potentiality. Concurrently therewith there is improvement in the solubility of the resin in hydrocarbon solvents, which is, of course, desirable although, as will be understood, a primary desideratum is control of after-yellowing.

I have discovered also that, strikingly enough, extensive hydrogenation of the resin is unnecessary to achieve the objects of the invention. It appears that actually the tendency to after-yellow may be repressed or eliminated by hydrogenation amounting to only a fraction of that theoretically possible. Such control of this disadvantageous property of these resins is explainable by a consideration of the structure of the indene polymer.

While various structural formulae have been predicated for the indene polymer, it is recognized that the indene monomer is represented by the structural formula:

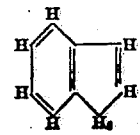

and from this it is observable that it contains a radical of cyclopentadiene:

Evidence of the existence of a cyclopentadiene radical, or structure, in the indene monomer is obtainable from color reactions of the indene monomer with aldehydes and ketones. By reacting aldehydes and ketones with the indene monomer, colored bodies are produced which are typical of the fulvenes obtained with cyclopentadiene and the same reagents. Thus, cyclopentadiene reacts with, for example, ketones, with production of intensely colored bodies accordingly to the reaction:

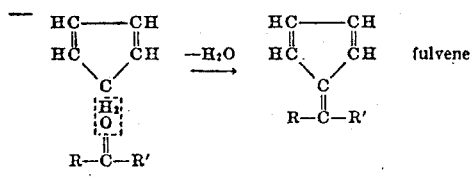

In so far as the indene monomer is concerned, the same reaction is possible:

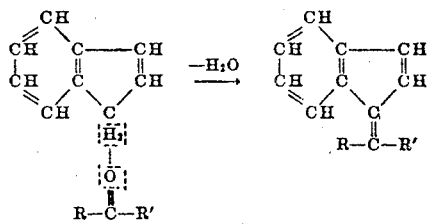

In the foregoing reactions R and R' may be hydrogen or alkyl or aryl radicals, depending on the particular ketone used. The same reaction occurs with aldehydes.

It is generally accepted that indene resins form by homopolymerization, i. e., that the polymerization takes place by molecular building in a chain structure, and on this basis the end unit of the polymer molecule contains a cyclopentadiene radical capable of reactions similar to those of the indene monomer. That is, an indene polymer would have the following structure:

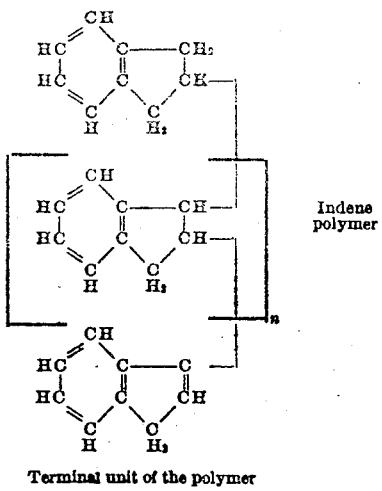

Terminal unit of the polymer

The terminal indene unit is as shown, irrespective of the number of indene units comprised in the polymer, and from what has been said it will be seen that it, too, is capable, theoretically, of reacting with aldehydes and ketones to produce deeply colored reaction products.

I have proved this to be the case by reacting indene polymer with aldehydes and with ketones. This procedure developed the color reactions typical of reaction of each aldehyde and ketone used with cyclopentadiene, thus proving that in the indene polymer there is a cyclopentadiene structure in reactive position.

In making these tests, I made an approximate 10 per cent solution of coumarone-indene resin in an aromatic solvent. To this solution, I added, without heating, a small amount of acetone, together with a few drops of an alcoholic solution of sodium hydroxide as an accelerator. At normal room temperature, a color reaction developed immediately and continued to intensify for a period of approximately one-half hour, when the liquid was a deeply-tinted brownish-red color. The literature shows that this color reaction is typical of the fulvene development produced by reaction of acetone with cyclopentadiene, and with the fulvene development occurring in the color reaction of acetone with the indene monomer. This I checked by actual test, and obtained the results given in the literature, and as obtained in the color reaction occurring with the polymer. The only observable difference in the color reaction between acetone and coumarone-indene resin, acetone with cyclopentadiene, and acetone with indene monomer, was slight differences in a color intensity.

I also checked by adding acetaldehyde, under identical conditions, to the resin solution, to cyclopentadiene, and to indene monomer. The coloration was in each case a relatively deep yellowish-brown. The reaction proceeded with a relatively great rapidity, at room temperature, which, in correlation with the depth of color obtained, showed that the coloration was due to fulvene development, rather than aldehyde polymerization.

Having thus established that coloration of the indene polymer may occur through reactions characteristic of fulvene development in a cyclopentadiene structure, it is reasonable to assume that in an indene polymer there is present at least one cyclopentadiene structure susceptible of producing fulvene bodies. As shown above, the terminal indene unit of the polymer presents such a radical in which a double bond present outside of the aromatic nucleus is linked by a carbon atom to the double bond of the pair of carbon atoms shared with the aromatic nucleus of the terminal unit, thus providing a true cyclopentadiene radical capable of the typical fulvene reaction. This may be represented as follows, considering only the terminal unit of the polymer:

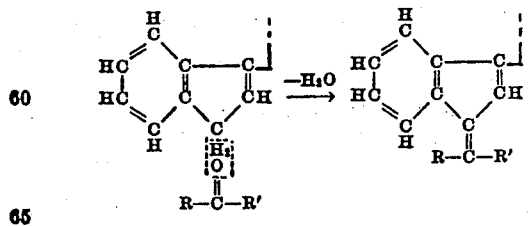

On this basis the phenomenon of after-yellowing is readily explainable, the necessary aldehyde or ketone being produced by oxidation of indene or coumarone polymer molecules, either or both, with reaction of other indene polymers therewith in accordance with the foregoing reaction and with consequent development of color in the resin. The terminal units of these polymers being most reactive, such oxidation may occur in accordance with the following structural formulae:

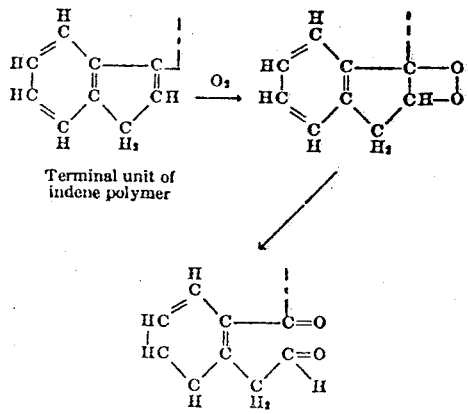

Terminal unit of indene polymer

Such an oxidation product may react, through one or the other of the >C=O linkages, with the cyclopentadiene radical of the terminal unit of an unoxidized indene polymer in the manner represented above. The coumarone polymers may likewise be oxidized to provide products similarly reactive. In both cases such reaction would be productive of colored bodies and would explain the after-yellowing of these resins.

The explanation given is thus wholly consistent with the fact of auto-yellowing in an indene film. It is also consistent with the rapid discoloration of the higher fractions of a waterwhite, freshly distilled, indene fraction of crude solvent naphtha. The action of oxygen in the foregoing manner is further demonstrable in the case of a film of pure coumarone-indene resin. It has been noted that the after-yellowing is a surface phenomenon because if a yellowed film be washed with a solvent for the resin, the underlying portion of the film is found to be unyellowed, but exposure of such a clean surface of resin leads to gradual yellowing of the surface so exposed.

Such discoloration is encountered also in the case of coumarone-indene resin heated with oils, e. g., tung oil, in making a cooked varnish, and in the case of a coumarone resin worked up with oils, by solution of the resin and without heating. In these cases the varnish is much darker than any of the ingredients. Here the resin is used in the presence of aldehydes and ketones, and the mass is subject consequently to a rapid and intensified discoloration.

Aldehydes and/or ketones being present either by initial inclusion, or in the case of a pure resin film by the action of oxygen, the fulvene or other color development may take place in typical manner. The effect of oxidation on an indene polymer film is not, therefore, directly to produce by oxidation an ingredient which itself colors the film, but is merely to produce one or more intermediate compounds capable of producing by reaction with the cyclopentadiene structure of the end unit of the indene polymer, a color body presumably of fulvene character. With all the above, my results are consistent.

The foregoing reactions explain also the fact that after-yellowing may be controlled without extensive hydrogenation. Thus, to prevent fulvene formation it is necessary only to saturate one of the C=C linkages of the cyclopentadiene radical, and although this will not destroy the reactivity of the radical, it does eliminate the chromophore normally present, with consequent destruction of the tendency to form colored reaction products.

Although the foregoing postulates explain satisfactorily the cause and mode of curing afteryellowing in these resins, I do not limit myself to such explanations.

Turning now to the operating conditions involved in the practice of the invention, important benefits flow from hydrogenation of the resin in solution. For reasons pointed out hereinafter it is desirable to hydrogenate at temperatures above atmospheric, and to hydrogenate the resin in solution. If the resins be fused disadvantages of serious and objectionable nature may be encountered, such as changes in molecular magnitude, with depreciation of resin properties. On the other hand, the use of solutions confers stability to heat at the temperatures desirable in practice, and such solutions are freed from catalyst more readily than is the case with fused resin. The factor of heat stability becomes increasingly important as the molecular weight of the resin increases.

Most suitably the solvent is one which is inert to hydrogenation because of more ready control of the reaction and for hydrogen economy. Suitable examples are cyclohexane and cycloparaffins, although petroleum solvents of similar nature, such as petroleum benzine, may be used, especially where the hydrogenation is conducted at superatmospheric temperature. For the same reasons it is best that the solution be free, or substantially so, from other materials capable of substantial hydrogenation.

Various catalysts are known capable of effecting hydrogenation, and while they might be used I prefer to use the metallic hydrogenation catalysts, particularly nickel. I have found that desirable results are to be had with the so-called "Raney" nickel catalyst. This is prepared from a nickel aluminum alloy ground to, say, approximately 200-mesh fineness. This finely-divided alloy is then sprinkled into a 10 per cent sodium hydroxide solution, which dissolves the aluminum. The metallic nickel, which remains as a sponge powder, is then purified by successive washings with pure water, and is introduced into a hydrocarbon, such as the resin solvent, and the water boiled off. In this condition, submerged in a hydrocarbon, and protected throughout its preparation from air, the sponge nickel is an efficient catalyst, and is for that reason used by me in conducting hydrogenation.

Hydrogenation of the resin begins at normal room temperature, but the rate is so slow that for reasons of economy it is desirable to operate at superatmospheric temperatures. The optimum operating temperature now appears to be about 200° or 205° C.; and at temperatures of the order of 225° or 250° C. objectionable actions are encountered, such as changes in molecular magnitude due to depolymerization or cracking, and even splitting of hydrogen from the molecule. Such degeneration of the resin molecule is, of course, to be avoided, and hydrogenation below about 200° C. is most desirable. However, within the range stated the main effect of temperature change is, as far as I am aware, that to be expected, viz., in the rate of hydrogenation. Consequently the particular temperature chosen will be dependent primarily upon economical considerations, due regard being paid to the factors of time and pressure.

Generally speaking, the hydrogen pressure is likewise not critical, and the particular pressure chosen will depend upon the results desired and economic considerations because for the purposes of the invention the effect of pressure change is to alter the rate of reaction and equilibrium point. Working with pressures from atmospheric up to rather high pressures, I have found that hydrogenation effective to repress after-yellowing is achieved. For some purposes it is desirable to render the resins substantially non-yellowing, and for such purposes rather low pressures may be used. As the pressure increases there is an increasing tendency toward hydrogenation of the aromatic nuclei of the resin molecules, and although this is unnecessary in preventing after-yellowing, it is desirable because it results in improved solubility in hydrocarbon solvents. In general, low pressures favor maximum repression of after-yellowing, at least from commercial standpoints, with minimum improvement in solubility characteristics, while high pressures afford maximum improvement in solubility, but with less than complete elimination of the tendency to after-yellowing. However, for many purposes resins hydrogenated at high pressures are satisfactorily resistant to after-yellowing. I now prefer to operate at pressures of, say 800 to 1,200 pounds.

The first phenomenon attributable to hydrogenation is one of bleaching of colored bodies initially present in the resin. This bleaching effect does not result from any substantial hydrogen-modification of the resin molecules, but merely from destruction of pre-existing color structures in the resin. In other words, such destruction does not depend chemically upon the introduction of hydrogen into the resin molecules capable of after-yellowing, such molecules being fully as capable of after-yellowing after bleaching as before. Color stabilization is, therefore, not effected by a mere bleaching treatment, and upon subjection to sunlight and atmospheric oxygen the development of the coloration known as "after-yellowing" begins, and proceeds as though the resin were untreated. Mere bleaching is of utility only to lighten the color of resin stocks which have in storage developed such deep coloration as to appear unattractive for sale even though the resin is purposed for such uses that after-yellowing is a matter of no practical importance.

The second phenomenon attributable to hydrogenation of the resin is color stabilization, i. e., an effect resulting from hydrogen-modification of the polymer molecules in such manner that the tendency of the resin to go through chemical changes resultant in "after-yellowing" is in practical effect inhibited, and for the purposes of this invention this is the major and most important consequence of hydrogenation, and that sought primarily.

A third phenomenon attributable to hydrogenation of the resin is increased solubility of the resin, and specifically increase in solubility of the resin in petroleum solvents.

Simple bleaching of pre-existing color bodies is attained readily and quickly, at atmospheric pressure, but as noted, this does not overcome after-yellowing. If a double bond of the terminal cyclopentadiene radical could be saturated, to the exclusion of other portions of the molecule, 2 pounds of hydrogen would suffice to eliminate after-yellowing in 800 pounds of resin. However, such selective hydrogenation is not attainable, and some hydrogenation of the aromatic nuclei occurs, and although this expenditure of hydrogen has no bearing on after-yellowing, it is compensated for by increased solubility.

As exemplifying the practice of the invention, reference may be made to the tests now to be described.

Test A.—In this test 50 gm. of coumarone-indene resin of 160° C. melting point were dissolved in 70 cc. of petroleum benzine of 90° to 135° C. boiling point. The solution was placed in a 1-quart capacity steel bomb with 50 gm. of Raney nickel catalyst. The bomb was flushed out with hydrogen and then charged therewith to a pressure of 310 pounds, following which it was heated gradually. At about 130 C. the rate of hydrogen absorption exceeded the total gas and vapor pressure, and the pressure dropped rapidly. The test was conducted for 20 hours at a maximum temperature of 150° C. and a maximum hydrogen pressure of about 300 pounds (total pressure 380-390 pounds), hydrogen being recharged three times when the total pressure in the bomb fell towards 200 pounds. After the solution had cooled it was filtered, to separate the nickel, and the resin was recovered from the filtrate by distillation of the solvent. It was very light in color, and was not subject to after-yellowing. For instance, after 65 days it showed no change in color. In contrast, the same resin untreated was yellow in about 3 days, and was very brown after 65 days. The melting point of the resin was not changed observably, but its solubility was improved from +65° C. to —14° C.

Solubility determinations reported herein are made by dissolving 5 gm. of resin in 20 gm. of Stoddard solvent naphtha, using gentle heating. The solution is then cooled and the temperature at which resin is deposited from solution is noted. Where a range is reported, the higher temperature is that at which the solution exhibits turbidity, and the lower that at which definite deposition of resin is observable.

Test B.—The bomb was charged with 100 gm. of 160° C. M. P. resin, 150 cc. of petroleum benzine, and 100 gm. of Raney nickel catalyst, and warmed slowly after charging hydrogen to 130 pounds pressure. In 10 minutes the pressure fell to 65 pounds, and to zero in less than 40 minutes, when hydrogen was recharged. The test was conducted 13 hours at a maximum hydrogen pressure of 130 pounds, a maximum temperature of 100° C., and with a total of 5 rechargings with hydrogen. The resin was recovered as described in Test A. The melting point was unchanged, but the yellowing tendency was but 15 per cent of that of the untreated resin. The solubility was changed from 59°-56° C. to 35°-33° C.

Relative yellowing tendency, as just referred to, is determined by a standardized procedure in which there is used as a standard a high grade unhydrogenated coumarone-indene resin having a melting point of 165° C., and an initial color depth of 1.5. A film of this resin is deposited on a glass slide at normal room temperature from a 20 per cent toluol solution of the resin, the solution being allowed freely to spread for evaporation. The film is then subjected to ultraviolet light of maximum intensity for a period of 5 hours, which produces maximum after-yellowing. This is taken as 100 per cent yellowing.

This standardized constant of color intensity is translated into conveniently usable relative units of color intensity. To do so two tubes are mounted in parallel vertical adjacency. These tubes have flat bottoms and are so mounted that glass slides may be introduced beneath them. An eye piece over the tubes brings the slide images seen through the tube bottoms visually into apparent contact with each other. The standard slide yellowed by ultra-violet light is inserted beneath one tube, and distilled water is introduced into the tube up to a convenient level therein. An unexposed slide is introduced beneath the other tube, and into this second tube there is introduced a solution of arbitrarily selected coloration. In this method there is used a solution of 4 milligrams of potassium dichromate in 1 litre of distilled water, which affords a standard of constant color intensity. This solution is introduced into the second tube until it has reached such level that the color depth is apparently uniform for the two tubes. The space between the dichromate level and the bottom of the tube is then graduated, the total height of the column being given the value of 100; and desirably graduation in the same units is continued above the level of the dichromate column to provide for evaluation of color intensity exceeding that of the resin which has been made the standard.

As noted before, a direct exposure to ultraviolet light for a period of 5 hours substantially exhausts the after-yellowing potentiality of the resin, any increase in color intensity which it is possible to develop thereafter being negligible.

In evaluating the yellowing potentiality of a hydrogen-modified resin, two tubes of which one is provided with the standard graduations are used. Duplicate slides of the hydrogen-modified resin are made, and one of them is exposed to ultra-violet light for a period of 5 hours. They are then placed beneath the tubes, the unexposed slide being placed beneath the tube which is graduated, and distilled water being put into the tube overlying the exposed slide. The yellowing value of the resin is then obtained by reading on the graduated tube the height of the standardized dichromate solution which produces an apparent uniformity in color between the unexposed resin and the exposed resin. This gives the relative yellowing potentiality of any particular resin provided the exposed and unexposed slides must be of the same resin.

The following experiments are illustrative also of variations in operating conditions and how they may be varied to control the results. These tests were conducted in a steel bomb using the same resin in each, viz., a coumarone-indene resin of 165° C. melting point (cube and mercury test), and an initial color depth of 1.5 on the resin scale. Its solubility was 59° C.–56° C. Petroleum benzine was used as the solvent in these tests.

Test C

Resin—4,530 grams.
Solvent—4,000 cc.
Raney nickel—3% weight of resin.
Temperature—maximum 215° C.
Time—18 hours.
Pressure of H₂—470 lbs.

| Sample | Hours | Solubility | Yellowing |
|---|---|---|---|
|  |  | °C. |  |
| (a) | 0 | 59–56 | 100 |
| (b) | 1 | 50–47 | 59 |
| (c) | 2.25 | 48–45 | 41 |
| (d) | 3 | 46–46 | 25 |
| (e) | 7.25 | 43–41 | 29 |
| (f) | 11.75 | 41–39 | 18 |
| (g) | 18 | 38–36 | 12 |

The treated resin was of imperceptible color; after being exposed to ultra-violet light it was of less than 0.25 color on the resin scale, which is non-yellowing by commercial standards.

Test D

Resin—4,530 grams.
Solvent—4,000 cc.
Raney nickel—3% weight of resin.
Temperature—maximum 223° C.
Time—11 hours.
Pressure of H₂—760 lbs.

| Sample | Hours | Solubility | Yellowing |
|---|---|---|---|
|  |  | °C. |  |
| (a) | 0 | 59–56 | 100 |
| (b) | 1.25 | 49–47 | 82 |
| (c) | 2.5 | 45–42 | 68 |
| (d) | 6.25 | 35–33 | 45 |
| (e) | 8.25 | 33–30 | 36 |
| (f) | 11.25 | 27–24 | 28 |

This illustrates the effect of increase in pressure in improving solubility. Relatively the after-yellowing potentiality was somewhat greater than that of the resin of Test C, but the resin was of acceptable grade as non-yellowing because on the resin scale the color was substantially less than 0.5 after exposure to ultra-violet light.

In other tests the treatment produced resins of greatly reduced or commercially non-yellowing tendency with solubilities as low as −65° C. Likewise, perfectly satisfactory results may be had with lower proportions of catalyst, say as little as 3 per cent based on the resin weight.

Test E.—In yet another test comparable results were had with a resin of 160° C. M. P., hydrogenated at a maximum temperature of 200° C. and pressure of 1,300 pounds. After 20 months the treated resin remained virtually colorless.

Test F.—This involved a high molecular weight resin made from crude solvent naphtha containing about 60 per cent by weight of idene. 2,000 cc. of the naphtha were diluted with 400 cc. of carbon tetrachloride and the mixture was treated at room temperature with 120 cc. of a 20 per cent solution of SnCl₄ in CCl₄. After standing over night the viscous mixture was thinned with 600 cc. of carbon tetrachloride and then poured in a thin stream into 12,000 cc. of methanol with violent stirring. The precipitated resin was filtered, dissolved in benzine, and reprecipitated, this purifying step being effected a total of four times.

This resin had a melting point of 237° C., which indicates a molecular weight of about 2,500. It was not soluble in Stoddard naphtha at the boiling point. 100 gm. of the resin with 150 gm. of cyclohexane and 50 gm. of Raney nickel were placed in the bomb and hydrogenated successfully in accordance with the invention, with a maximum bomb pressure of 1,950 pounds (initial hydrogen pressure at room temperature was 1,270 pounds), and a maximum temperature of about 200° C. The test was conducted for 9 hours. The resin was colorless, its solubility was 28° C., and, especially noticeable was the fact that it became soluble in petroleum solvents and linseed oil although the untreated resin was not soluble in them. The melting point was raised a few degrees by the treatment.

While I have, experimentally, extended the period of hydrogenating treatment to more than one day, in developed practice the period of treatment may be greatly reduced by the accelerating effect of continued moderate temperature, and moderate pressure. In any event, the time of treatment is chosen with regard to pressure and temperature conditions to effect hydrogenation to the extent necessary to develop the desired resistance to after-yellowing. In this connection it should be emphasized that it is saturation of the color-forming structure, presumably a double bond of the cyclopentadiene structure in the terminal indene unit, which it is necessary to effect. It is not necessary in order to attain repression or elimination of after-yellowing that any other point in the indene molecule be hydrogenated. It is undesirable from the viewpoint of producing a commercially non-yellowing coumarone-indene resin that any other point of the molecule be hydrogenated, and for this purpose extremely high pressures and temperatures are ordinarily not necessary. However, as indicated above, by appropriate correlation of time, temperature and pressure, the objects of the invention may be attained while at the same time effecting other advantageous results.

The resin obtained as a product of hydrogenation is not subject rapidly or in substantial degree to after-yellowing. This is proven by the clear comparatively colorless appearance of the resin after continued exposure to light, both in lump and as spread in a film, in direct comparison with unhydrogenated resin of identical source similarly exposed. I wish here to emphasize the fact that I produce a coumarone-indene resin which has been deprived of its yellowing potentialities, and that this resin is definitely hydrogen-modified coumarone-indene resin, usable for all the purposes to which coumarone-indene resin of previous production may be put, as well as more desirable for certain uses. Hydrogenation, as above described, not only produces a coumarone-indene resin freed from the undesirable quality of potential yellowing, but also results in decolorizing coumarone-indene resin in which color has developed.

From what has been said it will be appreciated that the invention is applicable not only to coumarone-indene resin, but also to resin essentially composed of polymerized indene because it is the indene polymer molecule that is essentially responsible for after-yellowing. By eliminating the color-forming power of a structure of that molecule by hydrogenation, probably by partial or complete saturation of a fulvene-forming linkage, throughout the indene polymer molecules of the resin it is rendered non-yellowing, and by partial destruction the after-yellowing power is reduced pro tanto. This results also in elimination of the darkening encountered heretofore in making varnish and the like, as explained above. The hydrogenation may occur according to one or the other of the following formulae:

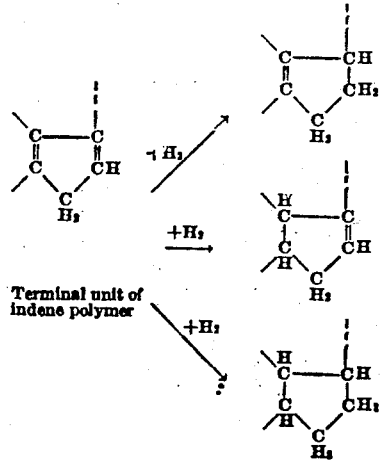

It is not known positively whether such hydrogenation does occur, or whether one or all three possibilities are realized, but all of them will act to destroy the color-forming potentiality of the untreated resin, and from my investigations I have reason to believe that some such mechanism is involved.

Coumarone may react similarly; for instance,

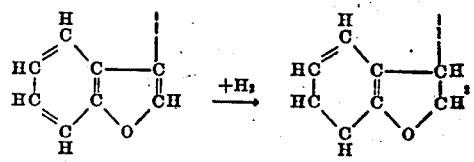

Terminal unit of coumarone polymer

The other possibilities represented for indene are likewise present.

From what has been said it will be apprehended that various modifications are permissible in the practice of the invention. For instance, the resin may be subjected to repeated hydrogenation, as with fresh lots of catalyst, and this may be desirable with batches of resin which may be recalcitrant to elimination of after-yellowing in consequence of a single treatment.

This application is a continuation-in-part of my copending application Serial No. 1,897, filed January 15, 1935. Claims generic to the subject matter disclosed and claimed herein are contained in my copending application Serial No. 209,372 filed concurrently herewith and likewise a continuation-in-part of my aforesaid application Serial No. 1,897.

According to the provisions of the patent statutes, I have explained the principle and manner of practicing my invention, and have described what I now consider to be its best embodiment. However, I desire to have it understood that, within the scope of the appended claims, the invention may be practiced otherwise than as specifically described.

I claim:

1. That method of treating resin material containing indene polymer to reduce after-yellowing thereof, which comprises providing a solution of said resin material, adding a metallic hydrogenation catalyst to said solution, subjecting the solution with agitation to the action of gaseous hydrogen at a temperature of about 150 to 225° C. and under a pressure of about 130 to 2,000 pounds per square inch and thereby hydrogenating said material and rendering it resistant to after-yellowing.

2. That method of treating resin material containing indene polymer, to reduce after-yellowing thereof, which comprises providing a solution of said resin material in a solvent substantially inert to hydrogenation, adding a metallic hydrogenation catalyst to said solution, and subjecting the solution with agitation to the action of gaseous hydrogen at a temperature of about 150° to 200° C. and at a pressure of about 130 to 2,000 pounds per square inch and thereby hydrogenating said resin and converting it to a hydrogenated form in which after-yellowing is substantially eliminated.

3. A method according to claim 2, said catalyst being metallic nickel.

4. A method according to claim 2, said catalyst being metallic nickel and the pressure being about 800 to 1,200 pounds per square inch.

5. That method of treating resin material containing indene polymer which comprises providing a solution of said resin material in a solvent substantially inert to hydrogenation and substantially free from substances other than said resin material capable of substantial hydrogenation, adding a metallic hydrogenation catalyst to the solution and subjecting the solution with agitation to gaseous hydrogen at a temperature of about 150 to 205° C. and at a pressure of about 800 to 1,200 pounds per square inch and thereby converting said resin to a form in which afteryellowing is substantially eliminated and solubility in hydrocarbon solvents is improved.

6. A method according to claim 5, said resin being coumarone-indene resin.

WILLIAM H. CARMODY.

CERTIFICATE OF CORRECTION.

Patent No. 2,266,675. December 16, 1941.

WILLIAM H. CARMODY.

It is hereby certified that error appears in the printed specification of the above numbered patent requiring correction as follows: Page 4, second column, line 12, for "130 C." read --130° C.--; page 5, second column, line 40, for "idene" read --indene--; page 6, second column, line 13, in the formula, for "$CH^2$" read --$CH_2$--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.